Dec. 8, 1970  P. F. WALTRICH  3,545,097
HIGH THERMAL CONDUCTIVITY PLASTIC TRAY FOR
FREEZE DRYING OF PRODUCTS
Filed Dec. 9, 1968

INVENTOR
PAUL F. WALTRICH
BY
Stanley Bilker
ATTORNEY

United States Patent Office

3,545,097
Patented Dec. 8, 1970

3,545,097
HIGH THERMAL CONDUCTIVITY PLASTIC TRAY FOR FREEZE DRYING OF PRODUCTS
Paul Francis Waltrich, Roslyn, Pa., assignor to Pennwalt Corporation, Philadelphia, Pa., a corporation of Pennsylvania
Filed Dec. 9, 1968, Ser. No. 782,088
Int. Cl. F26b 25/10
U.S. Cl. 34—238    5 Claims

ABSTRACT OF THE DISCLOSURE

An extended surface ribbed tray, especially for freeze drying of products, comprising a high thermal conductivity plastic composition molded or extruded with a high thermal conductivity filler and including an appropriate pigment for radiant or conductive heating.

---

This invention relates to a drying tray, and more particularly relates to plastic tray with an extended surface, finned or ribbed configuration, especially adapted for use in vacuum or freeze drying applications wherein the products to be dried will be supported on and/or moved along the tray while being exposed to radiant conduction heating.

Heretofore, ribbed trays for commercial freeze drying operations have generally been fabricated from extruded aluminum, because of its relatively high thermal conductivity coefficient, approximately 0.5 at 100° F., its strength and its lightness in weight. The aluminum trays were then anodized or coated with a material such as urethane paint in order to improve emissivity characteristics. The lengths of the trays varied from twenty to twenty-five feet for a "continuous" type tray in which the material was conveyed therethrough and could include passageways therein for the heat exchange fluid or medium. Examples of the continuous type tray are U.S. Pats. Nos. 3,264,747 and 3,264,756. Trays up to three or four feet in length were used to transport the material by being conveyed themselves, for example, U.S. Pats. Nos. 3,261,110 and 3,247,602.

The ribbed aluminum trays described above have been extremely successful and have reduced freeze drying cycles by 50 percent or more shorter time periods. However, despite the favorable density and cost characteristics of aluminum as a metal, it is relatively more expensive and higher in weight than most plastics when considering the extrusion or casting costs for aluminum compared to extruding or molding plastic compositions. Since ribbed trays are a highly specialized item, freeze drying equipment manufacturers were also limited in width by virtue of the availability of aluminum extrusion presses. That is, the width was limited by the aluminum extrusion press size. Also, the rib height to rib spacing (L/D) was limited.

It is therefore an object of this invention to provide an extended surface freeze drying tray made of a plastic composition.

Another object of this invention is to provide a finned or ribbed tray which is molded of a plastic composition which is lighter in weight, easier to handle, and less expensive in cost than a comparable aluminum tray extruded while at the same time having comparable thermal conductivity and emissivity characteristics.

Yet another object of this invention is to provide a molded plastic freeze drying tray which is food sanitary and resistive to the effects of biological or food components.

Still another object of this invention is to provide a molded plastic freeze drying tray which is structurally strong and capable of taking the punishment of freeze drying materials handling operations.

Other objects of this invention are to provide an improved device of the character described which is easily and economically produced, which is sturdy in construction and both highly efficient and effective in operation.

With the above and related objects in view, this invention consists of the details of construction and combination of parts as will be more fully understood from the following detailed description when read in conjunction with the following drawings in which.

Figure 1:
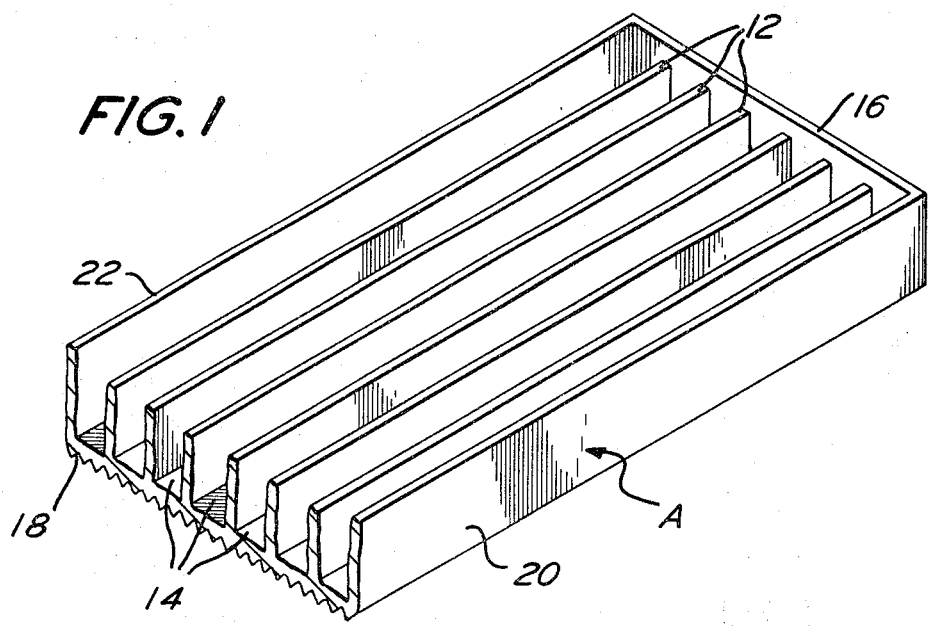
FIG. 1 is a fragmentary perspective view of a ribbed plastic freeze drying tray embodying the instant invention.

Referring now in greater detail to the drawing in which similar reference characters refer to similar parts, there is shown in FIG. 1 a ribbed tray generally designated as A, in which a plurality of upstanding fins 12 or extended surface members divide the body of the tray into a series of longitudinally extending channels 14. The material to be freeze dried may either be carried in the channels 14 or be conveyed therethrough such as by vibratory motion. If the tray A is used to transport the material from place to place, an end wall (not shown) similar to end wall 16 extending upwardly from the bottom 18 and between side walls 20 and 22 is incorporated at the opposite end of the tray A in order to prevent spillage of the material. The bottom 18 may be molded with serrations in order to increase the surface area of the lower surface by providing a high ratio of heat surface to product mass. It is also possible to exclude both end walls including end 18 whereby the material to be dried may be conveyed through the tray.

Figure 2:
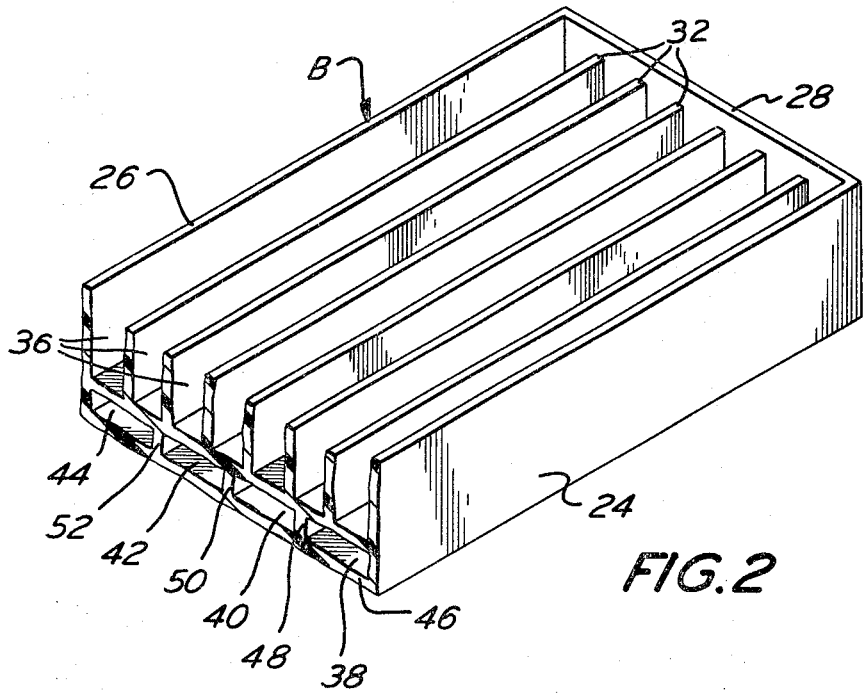
FIG. 2 is a fragmentary perspective view of another embodiment of the extended surface plastic tray in which the bottom is channeled for passage therethrough of a heat exchange medium.

In FIG. 2 is shown a tray B which comprises a pair of side walls 24 and 26 and optional end walls 28 upstanding from a bottom 30. Again, a series of longitudinally extending ribs 32 divide the tray into a plurality of channels 36. In the tray B, however, a plurality of passageways 38, 40, 42, and 44 are integrally incorporated below the bottom 30 through means of an under plate 46 which is spaced therebelow by separator member 48, 50, and 52 intermediate extensions of the side walls 24 and 26. The passageways 38, 40, 42, and 44 are used to carry a heat transfer medium, such as hot oil or steam, or to circulate such a medium in parallel or countercurrent flow.

The essence of the instant invention is the fabrication of either of the trays A or B (or any equivalent tray for freeze or vacuum drying) by preferably molding or extruding them from a thermally conductive plastic composition. A preferred molding compound from which the trays can be made is the polycarbonate resin, such as "Lexan," made by the General Electric Company of Pittsfield, Mass., or "Merlon," made by the Mobay Chemical Company of Pittsburgh, Pa. The polycarbonate resins offer superior heat resistance and thermal conductivity and provide excellent dimensional stability and high corrosion and impact resistance in the temperature range between −65° F. to +300° F., the range encompassed by freeze drying. Also, the polycarbonates have a specific gravity less than half that of aluminum.

In order to improve the thermal conductivity characteristic of the polycarbonate thermoplastic resin itself, it is desirable to incorporate a thermally conductive filler, such as graphite, copper, or aluminum powder, thereto in amounts of from between 10 to 40 parts per weight based on 100 parts of resin. A satisfactory composition is 25 parts per weight of graphite to 100 parts of resin. It is also desirable to incorporate a dark colored pigment, such as ferrous oxide or carbon black, 1-3% by weight, in order to bring the emissivity characteristics down to a coefficient of 0.9. Aging and light stabilizers, molding lubricants and plasticizers may be added in appropriate quantities to suit the particular application or molding equipment. Additives, such as glass fiber, may also be incorporated for reinforcement.

An example of a polycarbonate composition which will satisfy the nondegassing and thermal requirements of vacuum freeze drying, as well as the resistance to chemical attack and impact is:

| | Parts by weight |
|---|---|
| Polycarbonate resin | 100 |
| Graphite filler | 25 |
| Carbon black pigment | 2 |
| Metal stearate (alkali and alkaline earth) | 0.5 |
| Paraphenylene diamine | 0.5 |

Other suitable plastic resins for molding the trays A and B include polyvinylidene fluoride, such as "Kynar" made by Pennsalt Chemicals Corporation of Philadelphia, Pa., polyethylene, polyphenylene oxide, the polyimides, and polysulfone. Of course, the formulations for each would be understood by those skilled in the art.

Although this invention has been described in considerable detail, such description is intended as being illustrative rather than limiting, since the invention may be variously embodied, and the scope of the invention is to be determined as claimed.

What is claimed is:

1. An extended surface freeze drying tray comprising a shallow body portion having a bottom and side walls and including a plurality of ribs horizontally spaced from each other and upstanding from the bottom, said ribs being integrally formed with said bottom, all consisting essentially of a relatively high thermal conductivity synthetic resin, a thermally conductive filler intimately intermixed with the resin, and a black pigment compounded with the filler and the resin to produce an emissivity coefficient of at least 0.9 whereby heat will be efficiently transmitted to frozen particles contained within the tray by conduction and radiation in order to effect sublimation of ice from said frozen particles while under vacuum conditions.

2. The tray of claim 1 wherein said synthetic resin is selected from the group consisting of polycarbonates, polyvinylidene fluoride, polyethylene, polyphenylene oxide, polyimides and polysulfones.

3. The tray of claim 2 wherein the conductive filler is selected from the group consisting of graphite, aluminum flake and copper.

4. The tray of claim 3 wherein the pigment is selected from the group consisting of carbon black and ferrous oxide.

5. The tray of claim 2 wherein said body portion is extruded.

References Cited

UNITED STATES PATENTS

| | | | |
|---|---|---|---|
| 2,799,793 | 7/1957 | De Cain | 165 |
| | | | (Conduction Digest) |
| 3,239,000 | 3/1966 | Meagher | 126—271 X |
| 3,247,602 | 4/1966 | Hamilton | 34—237 |
| 3,261,110 | 7/1966 | Fuentevilla | 34—237 |
| 3,264,747 | 8/1966 | Fuentevilla | 34—92 X |
| 3,264,756 | 8/1966 | Fuentevilla | 34—237 |
| 3,321,012 | 5/1967 | Hervey | 126—271 X |
| 3,360,498 | 12/1967 | Rawlings | 161—183 |

FOREIGN PATENTS

| | | | |
|---|---|---|---|
| 558,124 | 12/1943 | Great Britain | 165—133 |

MARTIN P. SCHWADRON, Primary Examiner

H. B. RAMEY, Assistant Examiner